United States Patent [19]

Bezoari

[11] Patent Number: 4,596,859

[45] Date of Patent: Jun. 24, 1986

[54] PROCESS FOR METALATING VINYLIDENE HALIDE BASED POLYMERS

[75] Inventor: Massimo D. Bezoari, Baton Rouge, La.

[73] Assignee: The Dow Chemical Company, Midland, Mich.

[21] Appl. No.: 711,928

[22] Filed: Mar. 15, 1985

[51] Int. Cl.[4] .................................................. C08F 8/42
[52] U.S. Cl. ................................... 525/331.5; 525/366
[58] Field of Search ............................... 525/331.5, 366

[56] References Cited

U.S. PATENT DOCUMENTS 3,808,173  4/1974  Orihashi ........................... 525/331.5
4,243,770  1/1981  Tatemoto et al. .................. 525/366

OTHER PUBLICATIONS

"Chemical Conversions of Halogenated Polyolefines Caused by Organo-Lithium Compounds", N. A. Plate et al., Vysokomol. soyed. 8: No. 9, pp. 1562–1567 (1966).

"The Role of Chemico-Structural Effects in the Modification of Polymers", N. A. Plate, Vysokomol. soyed. A10: No. 12, pp. 2650–2661 (1968).

"Chemical Transformations and Catalytic Activity of Macromolecular Polylithium Compounds Polymerization", N. A. Plate et al., J. Polymer Sci.: Part C, No. 22, pp. 547–568 (1969).

"Reaction of n-Butyl-lithium with Poly(vinyl Chloride), K. Shina et al., Journal of Polymer Science: Part A-1, vol. 4, 1069–1079 (1966).

*Primary Examiner*—Joseph L. Schofer
*Assistant Examiner*—Bernard Lipman

[57] ABSTRACT

This invention relates to a process for metalating vinylidene halide based polymers by reacting them with a transmetalating organometallic compound and carrying out the reaction at a temperature within the range from about $-20°$ C. to about $-80°$ C. The resultant metalated vinylidene halide based polymers are useful intermediates in the preparation of functionalized polymers and graft copolymers.

14 Claims, No Drawings

PROCESS FOR METALATING VINYLIDENE HALIDE BASED POLYMERS

BACKGROUND OF THE INVENTION

Chlorinated polyethylene, polyvinyl chloride and vinylidene chloride based polymers are all recognized for their commercially desirable properties. Modification of these properties by the functionalization of the polymers or by the formation of graft copolymers with the polymers is desirable so that the new polymer product, while retaining some of the properties of the initial polymer, will have additional properties making it suitable for a particular use. The functionalization of and the production of graft copolymers with chlorinated polyethylene and polyvinyl chloride via the formation of an intermediate, respectively, a metalated chlorinated polyethylene or a metalated polyvinyl chloride, have been reported. See "Chemical Conversions of Halogenated Polyolefines Caused by Organo-Lithium Compounds", N. A. Plate et al, Vysokomol. soyed. 8: No. 9, pp. 1562–1567 (1966); "The Role of Chemico-Structural Effects in the Modification of Polymers", N. A. Plate, Vysokomol. soyed. A10: No. 12, pp. 2650–2661 (1968); "Chemical Transformations and Catalytic Activity of Macromolecular Polylithium Compounds Polymerization", N. A. Plate et al, J. Polymer Sci.: Part C, No. 22, pp. 547–568 (1969); and "Reaction of n-Butyl-lithium with Poly(vinyl Chloride)", K. Shina et al, Journal of Polymer Science: Part A-1, Vol. 4, 1069–1079 (1966).

The metalation route to the functionalization of and the formation of graft copolymers from vinylidene halide based polymers holds real promise and, therefore, it is an object of this invention to provide a process for the metalation of such polymers to yield useful intermediates. The intermediates can be reacted with functional groups and can be grafted onto or from to yield the desired functionalized polymer or graft copolymer.

THE INVENTION

This invention relates to a process for metalating a vinylidene halide based polymer which comprises adding a solvated transmetalating organometallic compound to a cement mix of the vinylidene halide based polymer and an ether-containing solvent, wherein the process occurs at a temperature within the range of from about $-20°$ C. to about $-80°$ C. Halogen utilization by metalation, dehydrohalogenation, cross-linking, alkylation, etc., is only from about 5 to about 40 percent of the halogen originally present in the vinylidene halide based polymer. Thus, the metalated polymer maintains most of its original physical properties for contribution to the final graft copolymer or functionalized polymer product. Furthermore, the pale color, solubility and pliability of these resultant products are indicative of a low amount of cross-linking and, especially, dehydrohalogenation in the intermediate.

By vinylidene halide based polymer, it is meant those polymers which contain at least up to about 50% vinylidene halide units. It is important that the selection of the polymer used be based, in part, upon the solubility of the polymer at reaction conditions in a solvent suitable for use with the process of the invention. Exemplary of a suitable vinylidene halide based polymer is SARAN which is produced by Dow Chemical Company and which contains from about 70 to about 85% vinylidene units and from about 15 to about 30% vinyl chloride units. A preferred polymer is one which contains about 80% vinylidene chloride units and about 20% vinyl chloride units.

The halide constituent of the vinylidene halide units is generally bromine or chlorine, with chlorine being the most preferred due to its recognized contribution to good physical properties for the polymer.

The solvent utilized to dissolve the polymer should be one which is non-reactive towards the transmetalating organometallic compound used in the reaction, is a liquid at reaction temperatures and is anhydrous. Ether-containing solvents are preferred. The ether constituent is preferably tetrahydrofuran, diethylether, 1,2-dimethoxy ethane or methoxy benzene. Generally, the weight percent of the vinylidene halide based polymer in the ether containing solvent will be below about 10 weight percent and preferably within the range of from about 2 to about 5 weight percent, all based on the total weight of the solution.

The transmetalating organometallic compounds used in the process of this invention are those which are capable of transferring a metal ion to the polymer under the process conditions. Due to their recognized transmetalating abilities, alkali metal alkyl compounds are preferred. The preferred alkali metal constituent is lithium. The alkyl constituent can contain up to about 8 carbon atoms and may have a tertiary, secondary or primary bond to the metal. For example, the alkyl constituent can be ethyl, n-butyl, sec-butyl, tert-butyl, methyl, phenyl, allyl, n-octyl, 2-methyl-2-butyl, propyl and the like. The preferred alkyl constituent is n-butyl. The compound, n-butyl lithium, has received wide acceptance in the transmetalation art as a superior reactant and is a preferred reactant for the process of this invention.

The high reactivity and high affinity for vigorous reaction with moisture makes it necessary to provide the transmetalating organometallic compounds to the process of this invention as anhydrous solutions. The solvents used are any of those which are commonly used by the chemical industry for handling such organometallic compounds and which remain a liquid and are non-reactive under process conditions. For example, hexane, pentane, benzene, toluene and various ethers are suitable. The molar concentration of the transmetalating organometallic compound in solution is preferably in the range of from about 1.0 to about 3.0.

The transmetalating reaction of the process of this invention should occur at a temperature below $-20°$ C. and preferably within the range of from about $-20°$ C. to about $-80°$ C. Ambient pressure is suitable. To maintain anhydrous conditions and to prevent unwanted "sport" reactions, the reaction should be carried out under a moisture-free inert atmosphere such as that provided by dry nitrogen or argon.

The relative amounts of the vinylidene halide based polymer and the transmetalating organometallic compound used for the reaction are determinative of the extent of lithiation of the vinylidene halide based polymer. In preferred processes of this invention, the molar ratio of organometallic to halogen in the polymer is within the range of from about 0.1 to about 0.3.

In order that any portion of the vinylidene halide based polymer solution does not see more of the transmetalating organometallic compound than other portions, it is desirable that the latter be added to the former while the entire reaction mix is continuously blended. Blending of the reaction mix will insure the homogeneity thereof and can be carried out by mechanical stirring, however, other conventional blending techniques may be used. The rate of addition of the transmetalating organometallic compound is any convenient rate which is in keeping with the capability of the blending method to insure substantial homogeneity of the reaction mix.

The metalated vinylidene halide based polymers produced by the process of this invention are, as before mentioned, useful in the production of graft copolymers and functionalized polymers. Such polymers are produced after the metalating reaction is substantially complete—such completion occurring within ten minutes of the organometallic addition and being indicated by the reaction mix obtaining a dark purple/green color. The grafting or functionalization procedure used can be any of those known to those skilled in the art. See, for example, the before-cited literature by Plate, Plate et al and K. Shina et al. For example, graft copolymers of vinylidene halide based polymers and electrophilic polymers can be produced by: adding an electrophilic polymer in a solvent, such as tetrahydrofuran, to the metalated vinylidene halide based polymer; precipitating the resultant product by the further addition of alcohol; and purifying the precipitate with an acetone wash. The reaction temperature is within the range of from about $-80°$ C. to about 50° C. Especially useful graft copolymers are those in which one copolymer moiety is SARAN and the other is polymethylmethacrylate or styreneacrylonitrile. Functionalization can be carried out by the reaction of the metalated vinylidene halide based polymer with carbon dioxide, oxalyl chloride, phosphorus oxychloride, sulfuryl chloride, dimethylfulvene, toluene diisocyanate and the like.

The invention is illustrated by the following examples. These examples are given merely for purposes of illustration and are not intended in any way to restrict the scope of the invention nor the manner in which it can be practiced.

The vinylidene halide based polymer used in the following examples was SARAN having a molecular weight of about 80,000 to about 100,000 and having about 80% vinylidene units and about 20% vinyl chloride units.

EXAMPLE I

1 Gram of SARAN was dissolved in 45 mL tetrahydrofuran in a 100 mL three necked flask fitted with a mechanical stirrer, $N_2$ inlet and stopper. The colorless solution was cooled to $-60°$ C. to $-70°$ C. with a dry ice/acetone bath. To the cooled solution, 2 mL of a 2.6M solution of n-butyl lithium in hexane was added dropwise from a syringe. The formation of lithiated SARAN was evidenced by the appearance of a purple/green color which appeared even while the n-butyl lithium was being added.

EXAMPLE II

A stochiometric excess of oxalyl chloride was added dropwise to about $-65°$ C. lithiated SARAN produced in accordance with the procedure of Example I. An immediate loss of color was noted. The resultant product was precipitated with methanol, dissolved in methylene chloride and reprecipitated with methanol three times. A cream-colored polymer was filtered from the reaction mix and washed with more methanol. The polymer product was sufficiently pliable to press into a film having a thickness of approximately two mils. This pressing was accomplished by preheating the polymer to 372° F. for $1\frac{1}{2}$ minutes followed by pressing the heated polymer under 15 tons pressure at a temperature of 372° F. for about $2\frac{1}{2}$ to about 3 minutes. The pressed polymer was then cooled for 5 minutes to room temperature under a pressure of 5 to 15 tons. The thin film was placed on a paper holder with windows for infrared scanning with a Perkin-Elmer 283 IR spectrometer. Absorption bands were found at 1800–1600 cm$^{-1}$ indicating the presence of carbonyl functional groups on the SARAN.

EXAMPLE III

To determine the percentage of chlorine sites which are lithiated and, by difference, the percentage of chlorine sites involved in side reactions, the following procedure was followed.

2 g of SARAN were dissolved as extensively as possible in 1 hour in stirred 80–90 mL anhydrous tetrahydrofuran under nitrogen. This solution was immersed in a dry ice/acetone bath until the contents of the flask were at $-45°$ C. Butyl lithium (1.7 mL of 2.6M solution in hexane, $4.4 \times 10^{-3}$ mole) was added to ca. 5 mL hexane, and added dropwise to the SARAN/tetrahydrofuran mixture. The clear mixture immediately darkened to a green/purple color. After addition was complete (ca. 2 minutes), the reaction was allowed to continue for 4–5 minutes. Addition of a mixture of ethanol, tetrahydrofuran, and water (ca. 1:1:1) caused the reaction mixture to turn to pale yellow, signifying the "quenching" of reactive metalated sites on the SARAN polymer. A few drops of phenolphthalein indicator in alcohol solution were added to the reaction vessel, and the mixture became purple, indicating the basicity of the mixture. A standard solution of HCl in $H_2O$ (0.379M) was added dropwise by means of a buret, until the purple indicator turned clear. The amount of HCl required for neutralization was 1.0 mL ($3.8 \times 10^{-4}$ mole). The amount of butyl lithium remaining in the syringe and bottle was found by washing them in $H_2O$ and titrating the resulting basic $H_2O$ as above. Thus, the amount of butyl lithium remaining in the syringe and bottle was found to be neutralized by 1.4 mL HCl (0.379M). The amount of butyl lithium actually used in the reaction was therefore (4.4−0.5) millimoles, i.e., 3.9 millimoles. The amount of active lithiated species is found to be $(0.38/3.9) \times 100$ percent of the added butyl lithium, i.e., 10%. The extent of side reactions was therefore 90%.

I claim:
1. A process for metalating a vinylidene halide based polymer which process comprises:
 (a) forming a reaction mixture by adding a first solution of an alkyllithium compound containing from 2 to about 8 carbon atoms and an inert solvent to a second solution of a vinylidene halide based polymer and an ether-containing solvent, said compound being added in an amount sufficient to provide a molar ratio of said compound to the halogen in said vinylidene halide based polymer within the range of from about 1:10 to about 3:10; and
 (b) maintaining the reaction mixture at a temperature below about $-20°$ C. until said metalation is substantially complete.
2. The process of claim 1 wherein said temperature is within the range of from about $-20°$ C. to about $-80°$ C.

3. The process of claim 1 wherein said alkyllithium compound is n-butyl lithium.

4. The process of claim 1 wherein said vinylidene halide is a vinylidene chloride.

5. The process of claim 4 wherein said vinylidene halide based polymer has about 80% vinylidene chloride units and about 20% vinyl chloride units.

6. The process of claim 3 wherein said vinylidene halide is vinylidene chloride.

7. The process of claim 6 wherein said vinylidene halide based polymer has about 80% vinylidene chloride units and about 20% vinyl chloride units.

8. The process of claim 7 wherein said inert solvent is hexane.

9. A metalated vinylidene halide based polymer which is produced by:
   (a) forming a reaction mixture by adding a first solution of an alkyllithium compound containing from 2 to about 8 carbon atoms and an inert solvent to a second solution of a vinylidene halide based polymer and an ether-containing solvent, said compound being added in an amount sufficient to provide a molar ratio of said compound to the halogen in said vinylidene halide based polymer within the range of from about 1:10 to about 3:10; and
   (b) maintaining the reaction mixture at a temperature below about $-20°$ C. until said metalation is substantially complete.

10. The metalated vinylidene halide based polymer of claim 9 wherein said alkyllithium compound is n-butyllithium.

11. The metalated vinylidene halide based polymer of claim 9 wherein the halide constituent of each vinylidene halide unit is chlorine.

12. The metalated vinylidene halide based polymer of claim 11 wherein said vinylidene halide based polymer initially has about 80% vinylidene chloride units and about 20% vinyl chloride units.

13. The metalated vinylidene halide based polymer of claim 10 wherein the vinylidene halide is vinylidene chloride.

14. The metalated vinylidene halide based polymer of claim 13 wherein the temperature is within the range of about $-20°$ C. to about $-80°$ C.

* * * * *